(12) United States Patent
Kuwabara et al.

(10) Patent No.: US 7,365,896 B2
(45) Date of Patent: Apr. 29, 2008

(54) PHOTOCHROMIC DEVICE

(75) Inventors: Tetsuo Kuwabara, Kofu (JP); Takuo Mochizuka, Fujieda (JP)

(73) Assignees: Yamanashi TLO Co., Ltd, Kofu-shi (JP); Murakami Corporation, Shizuoka-shi (JP)

( * ) Notice: Subject to any disclaimer, the term of this patent is extended or adjusted under 35 U.S.C. 154(b) by 162 days.

(21) Appl. No.: 11/155,772

(22) Filed: Jun. 20, 2005

(65) Prior Publication Data

US 2005/0270614 A1 Dec. 8, 2005

Related U.S. Application Data

(63) Continuation of application No. 10/802,770, filed on Mar. 18, 2004, now abandoned.

(30) Foreign Application Priority Data

Apr. 18, 2003 (JP) .............................. 2003-114140

(51) Int. Cl.
*F02F 1/15* (2006.01)
(52) U.S. Cl. .................................... 359/265
(58) Field of Classification Search ................ 359/238, 359/241, 242, 265, 266, 267; 252/583
See application file for complete search history.

(56) References Cited

U.S. PATENT DOCUMENTS

| | | | |
|---|---|---|---|
| 5,241,027 A * | 8/1993 | Miyashita | 526/259 |
| 5,373,392 A * | 12/1994 | Bala | 359/241 |
| 6,037,471 A | 3/2000 | Srinivasa et al. | |
| 6,362,914 B2 | 3/2002 | Baumann et al. | |
| 6,517,618 B2 * | 2/2003 | Foucher et al. | 106/31.16 |
| 7,008,568 B2 * | 3/2006 | Qin | 252/586 |
| 7,087,195 B2 * | 8/2006 | Kawasaki | 252/586 |

FOREIGN PATENT DOCUMENTS

| | | |
|---|---|---|
| JP | 08-253077 | 10/1996 |
| JP | 09-120088 | 5/1997 |
| JP | 10-114007 | 5/1998 |

OTHER PUBLICATIONS

Tarek H. Ghaddar, et al., "A Dendrimer-Based Electron Antenna: Paired Electron-Transfer Reactions in Dendrimers with a 4,4'-Bipyridine Core and Naphthalene Peripheral Groups", Journal of American Chemical Society, vol. 124, No. 28, 2002, pp. 8285-8289.
Ceroni, et al., New J. Chem., vol. 25, No. 8, pp. 989-993, "Dendrimers with a 4,4'-bipyridinium core and electron-donor branches. Electrochemical and spectroscopic properties (2001)".

* cited by examiner

*Primary Examiner*—Timothy Thompson
(74) *Attorney, Agent, or Firm*—Oblon, Spivak, McClelland, Maier & Neustadt, P.C.

(57) ABSTRACT

A photochromic device having a photochromic layer including a photochromic material which exhibits absorbance in a visible region upon being sensitized by a light having a wavelength of not less than 700 nm, and an ultraviolet light blocking device for blocking an ultraviolet light from sensitizing the photochromic material in the photochromic layer. The ultraviolet light blocking device includes at least one of an ultraviolet shielding layer positioned to shield the photochromic layer from the ultraviolet light and an ultraviolet light absorber included in the photochromic layer.

10 Claims, 4 Drawing Sheets

(1)

(2)

PHOTOCHROMIC DEVICE

CROSS-REFERENCE TO RELATED APPLICATIONS

This application is a continuation of U.S. application Ser. No. 10/802,770 filed Mar. 18, 2004 now abandoned. The present application also claims the benefit of priority to Japanese Patent Application No. 2003-114140, filed on Apr. 18, 2003, and the contents of those applications are herein incorporated by reference in their entirety.

BACKGROUND OF THE INVENTION

1. Field of the Invention

The present invention relates to a photochromic compound, a photochromic composition, and a photochromic functional element using the same. More particularly, the present invention relates to a photochromic functional element which can be used in an anti-glare mirror for automobile or such.

2. Description of the Related Arts

In the conventional automobile mirror, a technique has been developed which imparts mirror to an anti-glare property in order to improve visibility. The term "anti-glare property" used herein is a property that sunshine in the daytime, a headlight of next car in the nighttime and the like are reflected by an automobile mirror to decrease dazzling felt by a driver or a fellow passenger. As a mirror possessing such an anti-glare property, there is a mirror which utilizes a color mirror (so-called blue mirror) having a reflectance peak at a blue side (short wavelength side) and having a blue color on the surface thereof.

The human visibility has a peak at a wavelength of approximately 555 nm under a light condition, and yellowish green color becomes clearly visible. As the surroundings become dark, the peak of the visibility is gradually shifted toward a blue side, and the peak wavelength is to be at approximately 505 nm. In the blue mirror, the peak of reflectance characteristic exists in a range of from 400 to 510 nm. Consequently, the image reflected by the blue mirror has a peak deviating from the peak of the human visibility in the daytime and, thus it looks slightly dark, preventing dazzling of the sunshine. In the nighttime, the blue mirror has a peak accorded with the peak of the human visibility and, thus, the reflected image looks bright, excelling in visibility.

Typical examples of the conventional techniques which impart anti-glare property to an automobile mirror include those which apply a liquid crystal material, electrochromic material or such. Amongst them, a reflectance-variable, automobile mirror utilizing an electrochromic material will be described (See Japanese Patent Laid-Open No. 09-120,088).

As shown in FIG. 8, in an automobile mirror 300 having a reversibly variable transmittance, a prism-shaped mirror 180 is laminated on a surface 131 of a device having a reversibly variable transmittance by means of a transparent laminating material (layer 19). The prism-shaped mirror 180 comprises a prism-shaped piece 18 composed of an essentially transparent solid material (such as glass or transparent plastic), and a layer 18A of a highly reflective material (such as silver) adhered onto the surface of the solid material by a technique common to the mirror processing field, so that a light passing through the solid material and arriving at the reflective material layer is reflected toward the original direction via the solid material layer in a high ratio (preferably at least approximately 80%). The highly reflective layer 18A makes up reflective means for mirror.

The mirror comprises devices (electrochromic devices) having a reversibly variable transmittance through which a light before and after reflected from the reflecting means is passed. A wall 100, electrochromic elements 10 and 10A; a wall 130, electrochromic elements 13 and 13A; a spacer 11; a solution space 12; and a line or a strip 16 shown in FIG. 8 correspond to elements for the device (not shown), and the line or strip shown in FIG. 8 extends to lead lines of the device (not shown). The lead lines of the device (not shown) are connected to an element for controlling power supply (for example, switching means, means for controlling electric potential between electrodes).

The automobile mirror having a reversibly variable transmittance configured as described above is usually in a bleached state, where a light entering from the wall 100 (which is a solid material comprising glass or transparent plastic) is passed through the interiors of the electrochromic elements 13 and 13A, and is reflected at the reflective means 18A to be in a highly reflective state, exhibiting a function as a mirror. At the time of coloration, the light transmittance thereof is decreased so that the device is to be in a low reflective state where the reflected light is decreased, exhibiting an anti-glare function. In the case where such electrochromic elements are utilized in antiglare mirror, responding to the application of voltage and to making a short circuit, mutual switching between the coloration at the time of exhibiting anti-glare function and the bleaching at a usual mode is carried out.

However, in the automobile mirror having a reversibly variable transmittance utilizing such electrochromic elements, a sensor, which can be sensitized by a relatively strong light such as sunshine and a light from a head light of next car, a control circuit which controls the actuation of the electrochromic elements based on a signal produced from the sensor and other device should be separately required, leading to a problem associated with complicated configuration.

So, glazing has been suggested in Japanese Patent Laid-Open No. 10-114007 in which a photochromic material, whose absorbance at a visible light region is reversibly varied upon irradiation of a light with a specific wavelength is applied to glazing so that the glazing can become dark upon receiving a strong light such as sunshine whereby the light reflectance thereof is decreased to prevent a driver and others who get into a car from being dazzled (Japanese Patent Laid-Open Publication No. 10-114007).

Examples of the photochromic materials applied to this glazing include a material comprising a silver salt, particularly a silver halide, as an active component dispersed in a glassy matrix so that the active component such as the silver halide just mentioned is reversibly transformed into a state of a metal bonded body, and a material comprising an organic dyestuff (pigment) as an active component dispersed in a polymeric matrix.

In the glazing utilizing the latter material, the photochromic material absorbs a light in an ultraviolet region to thereby be reversibly isomerized, causing coloration or bleaching in a reversible manner. Typical examples of the organic pigments include compounds derived from spirooxazine and spiropyran.

However, in the glazing utilizing the photochromic material described above, irradiation of ultraviolet light contained in sunshine is required for causing coloration and bleaching of the photochromic material in a reversible manner. For this reason, even if a light from a head light of an oncoming car enters into the glazing, it has been difficult to color the mirror enough for preventing a driver or such from dazing due to its weak strength of ultraviolet light in the automobile head light. Consequently, in such a case, a light source, which can irradiate the photochromic materials with an ultraviolet light at a strength sufficient for reversibly changing coloration and bleaching, is required to be separately placed. This poses a problem in terms of insufficient practical use.

The present invention has been made in light of the above problems, and a first object of the present invention is to provide a photochromic material, which does not exhibit any photochromic property in response to a light having a wavelength within a visible region and which is sensitized by a light having a given wavelength within a wavelength region of not less than 700 nm (particularly infrared region) and absorbs a light in visible region, and to provide a functional element using such a phenomenon. Specifically, in the photochromic material and the photochromic phenomenon according to the present invention, since it is sensitized by a light having a specific wavelength within a wavelength region of not less than 700 nm (particularly infrared region) to exhibit a photochromic property, a light having a wavelength in ultraviolet region is not required for the photochromic property.

A second object of the present invention is to provide a functional element such as a photochromic display element applicable to an automobile mirror having an anti-glare property utilizing such a photochromic material and such a photochromic phenomenon as described above.

SUMMARY OF THE INVENTION

We have examined various compounds each having an electron donor and an electron acceptor within the molecule thereof, and exhibiting a photochromic phenomenon upon being excited with a specific light for the characteristics of their excitation wavelength.

As a result, it has been clarified that when a light (such as a xenon light source) having a specific wavelength (for example, 830 nm) within an infrared region of not less than 750 nm is irradiated to 4,4'-bipyridine derivative represented by the following formula (1):

It is noted that the conventional photochromic compound is required to be irradiated with a light having a wavelength in ultraviolet light region of from 380 nm to 400 nm to exhibit its photochromic phenomenon.

With regard to compound analogous to the 4,4'-bipyridine derivative represented by the formula (1) described above (derivatives in which a benzene ring at the terminal of the dendrimer construction adducted to the 4,4'-bipyridine is substituted with other substituent (e.g., naphthalene)), Ghaddar et al., of North Carolina State University reported the change in the absorbance of various 4,4'-bipyridine derivatives at a wavelength of 600 nm, which is within a visible light region, excited by an ultraviolet light having a wavelength of 266 nm (Journal of American Chemical Society, 2002, 124, P8285-8289). However, this report shows the photochromic property within an ultraviolet light region, and does not show any photochromic property upon irradiation of a light having a wavelength of not less than 700 nm (especially infrared region). Also, this report does not disclose the 4,4'-bipyridine derivative represented by the formula (1) described above, (derivatives whose the terminal of the dendrimer construction adducted to the 4,4'-bipyridine is a benzene ring).

In contrast, we have clarified for the first time that the 4,4'-bipyridine derivative represented by the formula (1) can be sensitized by a light having a specific wavelength in infrared region to exhibit a photochromic phenomenon. Also, by employing the 4,4'-bipyridine derivative having such a characteristic, a photochromic display element which exhibits a blue color upon being sensitized by a light having a specific wavelength in infrared region can be realized. Such a light is contained in a head light utilizing a white and bright xenon light source, which recently appeared and has been used in a part of an automobile. It has been found that a functional element utilizing a photochromic phenomenon that is triggered by a light having a wavelength of not less than 700 nm or specific wavelength within infrared region and exhibits absorption in visible region can be realized.

Such a phenomenon, that is to say, a colored state exhibited upon irradiation of a light having a specific wavelength within infrared region and reversed to a bleached state when non-irradiation, is thought to be caused by a photochemical

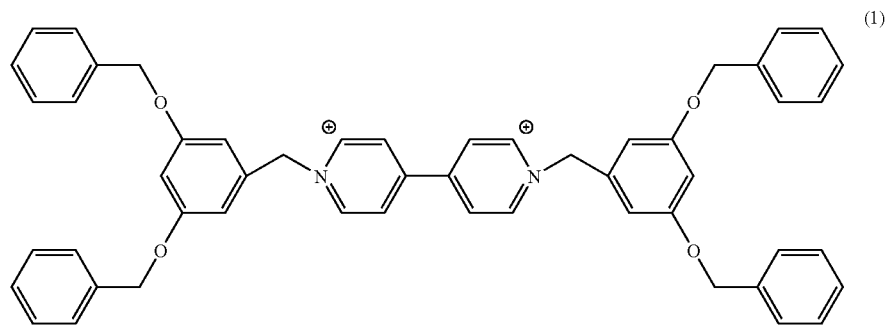

the absorbance of the 4,4'-bipyridine derivative at approximately 610 nm as a center is increased and the 4,4'-bipyridine derivative is blue-colored, while it becomes gradually a transparent color, when the irradiation of the above-mentioned light is stopped or the derivative is placed in a dark place.

reaction of the 4,4'-bipyridine derivative represented by the formula (1) where at the time of coloration, it is reduced and colored and at the time of bleaching, it is in a stable form due to the reversible reaction.

It has been clarified that substances having a structure or properties analogous to that of the 4,4'-bipyridine derivative (biologen derivative) represented by the formula (1) may attain the foregoing and other objects according to the present invention. It has also been clarified that depending upon structure, substances can be sensitized by a light having a specific wavelength of not less than 700 nm, while not being restricted to an infrared region of not less than 750 nm, to exhibit a photochromic phenomenon.

For example, a 4,4'-bipyridine derivative represented by the following formula (2) in which the terminal betizene ring of the dendrimer structure adducted to 4,4'-bipyridine is substituted with other condensed ring (such as naphthalene) falls under the photochromic material according to the present invention.

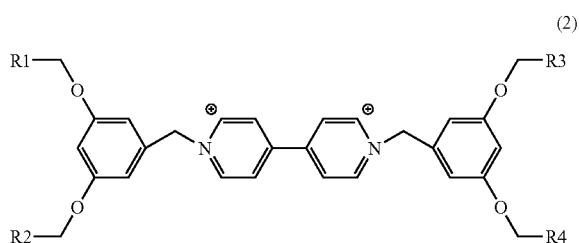

(2)

wherein $R_1$, $R_2$, $R_3$, and $R_4$ may be the same or different from each other and each is a condensed aromatic hydrocarbon or a derivative thereof.

Also, a 4,4'-bipyridine derivative represented by the following formula (3) falls under the photochromic material according to the present invention.

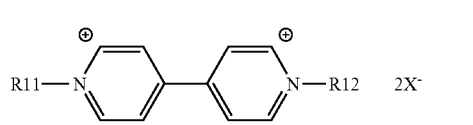

(3)

wherein $R_{11}$ and $R_{12}$, may be the same or different from each other and each is an alkyl group having 1 to 10 carbon atoms or a derivative thereof, and $X^-$ is selected from among $Cl^-$, $BF_4^-$, $PF_6^-$, $AsF_6^-$, $ClO_4^-$, and $NO_3^-$.

The photochromic composition according to the present invention comprises a solution having the photochromic compound according to the present invention dissolved in one solvent or a mixed solvent selected from dimethylformamide (DMF), dimethylacetamide, propylene carbonate, acetonitrile, gamma-butyllactone, and butanol.

A photochromic film according to the present invention may comprise a film having the photochromic compound according to the present invention contained in a dissolved form.

In such a form, a photochromic composition having the photochromic compound dispersed in a prescribed solvent or a polymer film makes it easy to realize various functional elements such as display elements. What is more, the use of the photochromic compound according to the present invention meets a production of functional elements satisfying various needs including its function, its performance, and a cost.

It is noted that the photochromic film according to the present invention may be formed, for example, by adding PVP (polyvinyl pyrolidone), polymethyl metacrylate (PMMA) or such to be thicken, followed by film formation.

Also, it can be formed by adding the photochromic compound to a composition containing monomer which is polymerizable by vinyl-addition polymerization, ring-opening addition polymerization or a combination thereof (such as epoxy, acrylic and urethane monomers), followed by polymerization. Furthermore, it can be formed by the addition of the photochromic compound according to the present invention, utilizing any of the known resin formation techniques such as ultraviolet curing and thermal curing. It should be noted that polymers making up a matrix for the photochromic compound according to the present invention are not specifically restricted, but various polymers are applicable as long as they can highly disperse the photochromic compound according to the present invention and chemically stable.

As described above, the functional element according to the present invention has a photochromic layer which can be sensitized by a light having a wavelength of not less than 700 nm or a specific wavelength within infrared region, and which exhibits absorbance within visible region, and a light source which provides an energy in a wavelength region of not less than 700 nm or a specific wavelength within infrared region enough for sensitizing the photochromic compound, utilizing a photochromic phenomenon triggered by a light having a wavelength of not less than 700 nm or a specific wavelength within infrared region, and exhibiting absorbance within visible region.

The functional element constructed as described above basically possesses an effect that it is sensitized by a light (for example, a xenon light source) having a wavelength of not less than 700 nm, particularly a specific wavelength within infrared region of not less than 750, nm to exhibit a photochromic phenomenon. Specifically, a photochromic display element which reversibly brings out coloration within a visible light region upon irradiation of a light (for example, a xenon light source) having a wavelength of not less than 700 nm, particularly a specific wavelength within infrared region of not less than 750 nm.

The functional element according to the present invention may be constructed to possess an ultraviolet shielding member, which shields an incident ultraviolet light entering into the functional element.

In the functional element constructed as described above, since a member for shielding an ultraviolet light is provided at a side where a light enters into the photochromic layer, the deterioration of the photochromic layer due to an ultraviolet light can be prevented.

Also, since a member for shielding an ultraviolet light is provided at a side where a light enters into the photochromic layer, a photochromic layer is prevented from exhibiting its photochromic phenomenon, even if it is capable of being sensitized by a light within ultraviolet region.

The functional element according to the present invention may be constructed such that the photochromic layer containing the photochromic compound contains an ultraviolet absorber, which absorbs an ultraviolet light.

Similarly, the photochromic composition and the photochromic film according to the present invention may also have such an ultraviolet absorber.

In the functional element, photochromic composition, and photochromic film above, the deterioration of the photochromic layer due to an ultraviolet light can be prevented.

An example of the functional element includes a photochromic display element.

As the display elements utilizing an emitter, various industrial products such as automobile meters, and display portions of cellular phones have been put into practical use.

Using a light source (such as a xenon light source) having a specific wavelength within a wavelength region of not less than 700 nm and photochromic materials which can be sensitized by such a light source, a display element can be made with no complicated control circuit. Also, such a display element according to the present invention can be jointly used as a dimming element together with any of the conventional techniques.

Another example of the functional element includes an anti-glare mirror.

Being applied to an automobile mirror, the present invention can solve the problem of complicated configuration due to control circuits for controlling the actuation of an electrochromic element the conventional electrochromic element. Also, in the present invention, there is no need for separately providing a light source for irradiating an ultraviolet light in order to exhibit a photochromic phenomenon as in the conventional anti-glare mirror utilizing a photochromic material. Consequently, an anti-glare mirror without any sensor and control circuit can be provided, making it extremely practical application.

DESCRIPTION OF THE PREFERRED EMBODIMENTS

Figure 1:
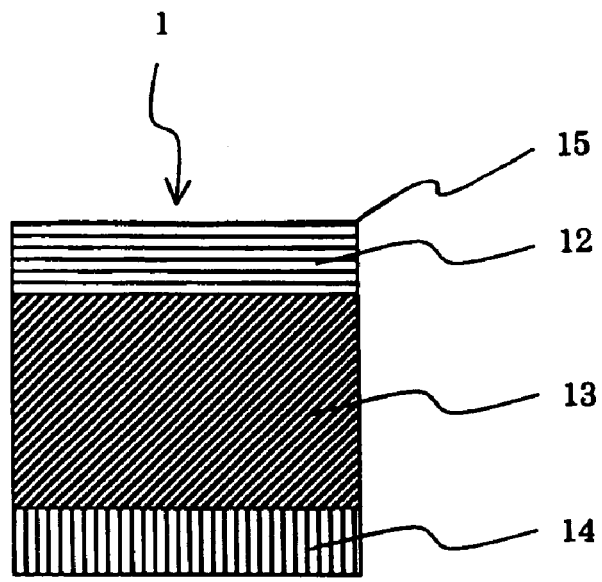
FIG. 1 is a cross-sectional view schematically showing a configuration of a photochromic display element according to a first embodiment of the present invention.

Embodiments of the present invention will now be described by referring to the drawings.

Photochromic Element According to First Embodiment

FIG. 1 is a cross-sectional view schematically showing a configuration of a photochromic display element 1 according to a first embodiment of the present invention. As shown in FIG. 1, a photochromic element 1 is composed of a transparent substrate 12 placed on a front surface side, and a substrate 14 placed on a rear surface side between which a photochromic layer 13, which contains a photochromic compound and which exhibits a photochromic phenomenon, is intervened.

The transparent substrate 12 at the front surface side and the substrate 14 at the rear surface side are both made of glass. The photochromic layer 13 is composed, for example, of a photochromic compound represented by the formula (1). At a front surface side of the transparent substrate 12 at the front surface side, an ultraviolet light shielding member 15 for shielding an ultraviolet light is provided.

The present invention is not specifically restricted to the substrates making up the substrate 12 and the substrate 14, respectively, but any of the conventional transparent substrates and substrates can be applied as long as they have a transparency and/or strength required in the present invention. For example, glass such as a soda lime glass and a transparent resin such as an acrylic plate may be used. Also, in the present invention, the ultraviolet light shielding member 15 is not specifically restricted, and any of the conventional ultraviolet light shielding members is applicable as long as they can prevent the photochromic compound according to the present invention from being deteriorated through an ultraviolet light. For example, an ultraviolet cutting film may be applied to the transparent substrate 12 via an adhesive. Also, a thin film for shielding an ultraviolet light may be formed onto the transparent substrate 12 by any of various methods. Alternatively, the transparent substrate 12 itself may be made of ultraviolet absorbing glass or colored glass.

The photochromic element 1 according to the first embodiment of the present invention constructed as described above basically possesses an effect that it is sensitized by a light (for example, a xenon light source) having a wavelength of not less than 700 nm or a specific wavelength within infrared region to exhibit a photochromic phenomenon. Specifically, a photochromic display element which reversibly brings out coloration within a visible light region upon irradiation of a light (for example, a xenon light source) having a wavelength of not less than 700 nm or a specific wavelength within infrared region can be realized.

In the functional element constructed as described above, since a member for shielding an ultraviolet light is provided at a side where a light enters into the photochromic layer, the deterioration of the photochromic layer due to an ultraviolet light can be prevented.

Also, since a member for shielding an ultraviolet light is provided at a side where a light enters into the photochromic layer, the photochromic layer is prevented from exhibiting its photochromic phenomenon even if it is capable of being sensitized by a light within an ultraviolet region.

In the first embodiment described above, the photochromic element 1 may be constructed so as to possess a light reflective layer at a front surface of the substrate 14 placed at the rear surface side (a surface at the side of the photochromic layer or a surface at the opposite side). Also, the substrate 14 itself may be composed of a light-reflective substrate comprising a light-reflective material.

In such a configuration, a mirror having the photochromic function can be realized. This configuration is suitable for an automobile anti-glare mirror.

In the present invention, materials for the light-reflective layer and the light-reflective substrate are not specifically restricted, and various materials having a light-reflective function conventionally known are applicable, as long as they exhibits the effects of the present invention. Amongst them, from the viewpoints of a light-reflective function, chemical stability, productivity, and a cost, the light-reflective layer and the light-reflective substrate may be composed of a thin metal film comprising Cr as a main component. Also, the production of the light-reflective layer is not specifically restricted in the present invention, and the light-reflective layer may be produced by any of various known methods in which various kinds of known light-reflective substances (such as Al, Cr, Ni, Ag, and Rh) may be formed into a layer having a prescribed thickness including, but being not restricted to, wet processes such as application methods, plating methods, and electrophoresis methods as well as dry processes such as deposition methods and sputtering methods. Also, it is possible to obtain a given color and a given reflecting ratio by a combination of an optical thin film with a reflective metal.

Photochromic Element According to Second Embodiment

Figure 2:
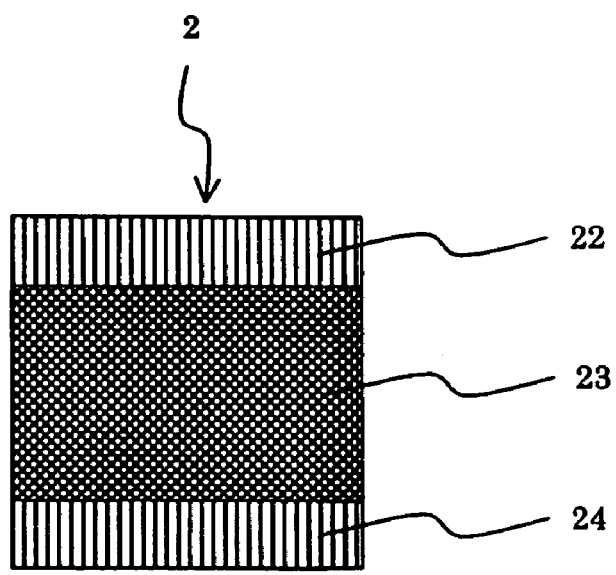
FIG. 2 is a cross-sectional view schematically showing a configuration of a photochromic display element according to a second embodiment of the present invention.

FIG. 2 is a cross-sectional view schematically showing a configuration of a photochromic element 2 according to a second embodiment of the present invention. As shown in FIG. 2, a photochromic element 2 is composed of a transparent substrate 22 placed on a front surface side, and a substrate 24 placed on a rear surface side between which a photochromic layer 23, which contains a photochromic compound and which exhibits a photochromic phenomenon, is intervened.

The transparent substrate 22 at the front surface side and the substrate 24 at the rear surface side are both made of glass. The photochromic layer 23 is composed, for example, of a photochromic compound represented by the formula (1). An ultraviolet absorber, which absorbs an ultraviolet light, is included in the photochromic layer 23.

The ultraviolet absorber which can be used in the present invention are not specifically restricted, and various ultraviolet absorbers known in the art may be applied as long as they can prevent the photochromic compound according to the present invention from being deteriorated. In the present invention, for example, a benzophenone type ultraviolet absorber (2,4-dihydroxybenzophenone) or such commercially available from Sumitomo Chemicals Co., Ltd., Dainippon Ink and Chemicals Inc., or Dow Chemicals Inc. may be added to a photochromic solution making up the photochromic layer or a polymer film containing the photochromic compound, after confirming that the ultraviolet absorber can be dissolved in a solvent composition well.

The photochromic element 2 according to the first embodiment of the present invention constructed as described above basically possesses an effect that it is sensitized by a light (for example, a xenon light source) having a wavelength of not less than 700 nm or a specific wavelength within infrared region to exhibit a photochromic phenomenon. Specifically, a photochromic display element which reversibly brings out coloration within a visible light region upon irradiation of a light (for example, a xenon light source) having a wavelength of not less than 700 nm or a specific wavelength within infrared region can be realized.

The ultraviolet absorber in the photochromic element 2 can prevent the photochromic layer or the composition from being deteriorated through an ultraviolet light.

Also, even if the photochromic layer is capable of being sensitized by a light within ultraviolet region to exhibit a photochromic phenomenon (for example, in the case where the layer is composed of the photochromic compound represented by the formula (1)), the ultraviolet absorber prevents the photochromic layer from being sensitized by such a light, thus not exhibiting the photochromic phenomenon.

In the second embodiment described above, the photochromic element 2 may be constructed so as to possess a light reflective layer at a front surface of the substrate 24 placed at the rear surface side (a surface at the side of the photochromic layer or a surface at the opposite side).

In such a configuration, a mirror having the photochromic function can be realized. This configuration is suitable for an automobile anti-glare mirror.

Figure 3:
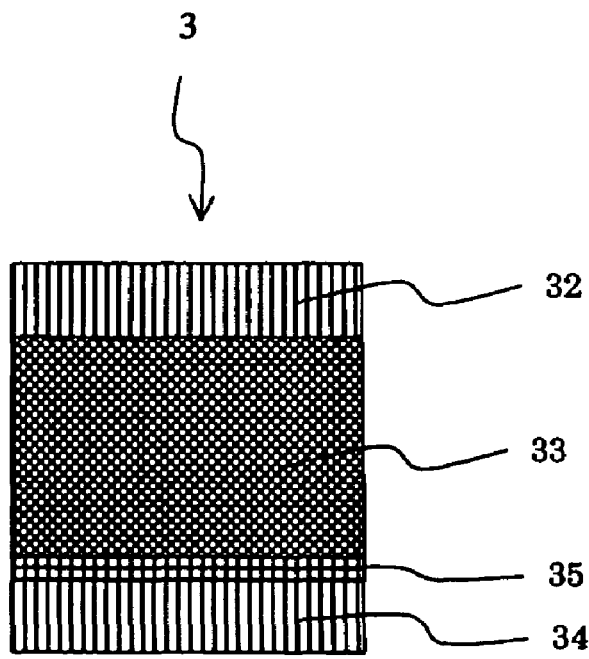
FIG. 3 is a cross-sectional view schematically showing a configuration of a photochromic display element according to a third embodiment of the present invention.

For example, as shown in FIG. 3 (third embodiment), a photochromic display element 3 may be composed of a transparent substrate 32 placed on a front surface side, and a light reflective film 35 placed on a front surface side of a substrate 34 between which a photochromic layer 33, which contains a photochromic compound and which exhibits a photochromic phenomenon, is intervened. The photochromic layer 33 has an ultraviolet absorber which absorbs an ultraviolet light included therein. This configuration is suitable for an automobile anti-glare mirror.

In the second embodiment described above, the substrate 24 placed at the rear surface side may be composed of a light-reflective substrate.

In such a configuration, a mirror having the photochromic function can also be realized.

Figure 4:
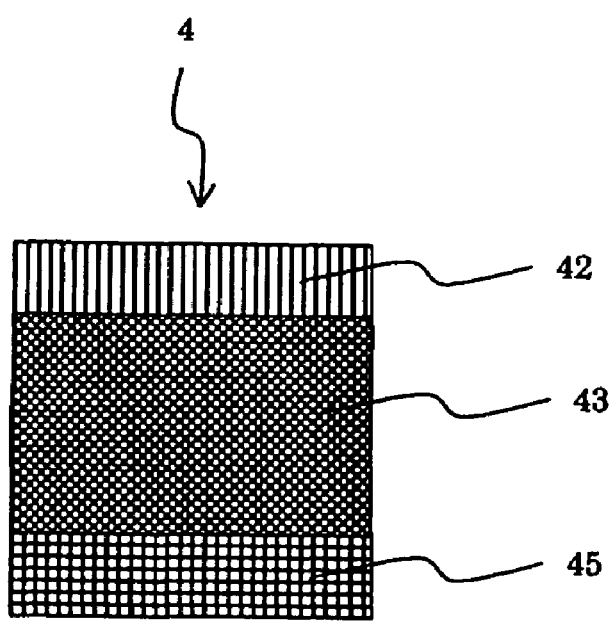
FIG. 4 is a cross-sectional view schematically showing a configuration of a photochromic display element according to a fourth embodiment of the present invention.

For example, as shown in FIG. 4 (fourth embodiment), a photochromic display element 4 may be composed of a transparent substrate 42 placed on a front surface side, and a light-reflective substrate 45 placed on a rear surface side between which a photochromic layer 43, which contains a photochromic compound and which exhibits a photochromic phenomenon, is intervened. The photochromic layer 43 has an ultraviolet absorber which absorbs an ultraviolet light compounded therein. This configuration is suitable for an automobile anti-glare mirror.

In the present invention, materials for the light-reflective substrate placed on the rear side are not specifically restricted, and various materials having light-reflective characteristics, which can exhibit the effects of the present invention are applicable. Examples which can be used in the present invention include substrates having a layer of any of various light-reflective substances (such as Al, Cr, Ni, Ag, and Rh) formed on the surface, substrates made of the light-reflective substances just mentioned or aluminum alloy plates or stainless steel plates having a prescribed glossiness.

EXAMPLES

Photochromic compounds and photochromic elements utilizing the photochromic compounds according to the present invention will now be specifically described.

4,4'-Bipyridine derivative represented by the following formula (1) was synthesized by a method shown below.

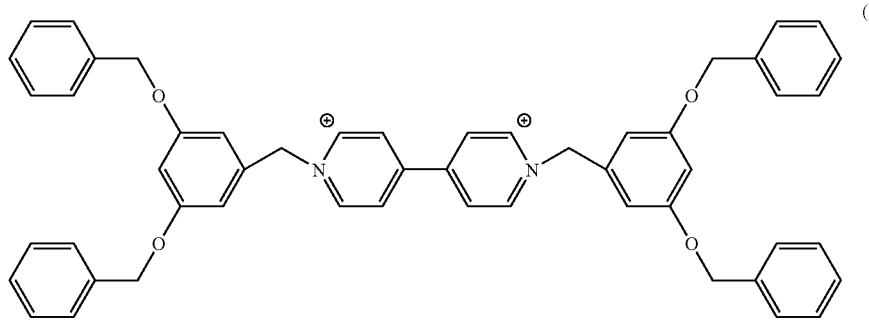

(1)

Figure 5:
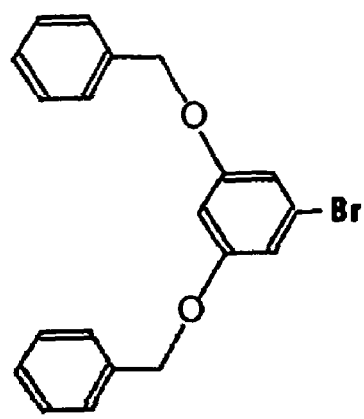
FIG. 5 is a drawing for explaining a process for synthesizing a photochromic compound according to the present invention.
Figure 5:
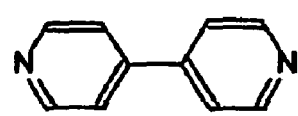

To a solution of a compound shown in FIG. 5 (1) [3,5-dibenzyloxybenzyl bromide, alias: 3,5-bis(benzyloxy) benzyl bromide] in dry acetonitrile, a solution of a compound shown in FIG. 5 (2) [4,4'-bipyridine, alias: 4,4'-bipyridyl]] in dry acetonitrile was added dropwise under a reflux condition over a period of tens of minutes, and the mixture was refluxed over a period of several days. After the reaction was completed, the solution was allowed to cool down to a room temperature. This gave a yellow crystal. This was washed with acetonitorile and with ether and recrystallized from methanol to obtain 4,4'-bipyridine derivative represented by the formula (1).

The resulting 4,4'-bipyridine derivative (12 mg) and 50 mg of polyvinylpyrolidone ultraviolet absorber were weighted and they were dissolved in 0.5 ml of DMF dimethylformamide) to prepare a solution of 4,4'-bipyridine derivative in DMF.

Subsequently, the solution of 4,4'-bipyridine derivative in DMF was applied to a soda lime glass, dried in vacuo at 60° C. to obtain an approximately 0.1 mm thick film. This film was then sandwiched between ultraviolet light shielding films (UV cutting films available from Achilles Co., Ltd. under a trade name of Achilles Vinylus), irradiated with a light from a xenon lamp having spectral characteristics shown in FIG. 6, and was measured for absorbance before and after the irradiation. As a result, the absorbance of the film containing the 4,4'-bipyridine derivative was changed as shown in FIG. 7.

Figure 6:
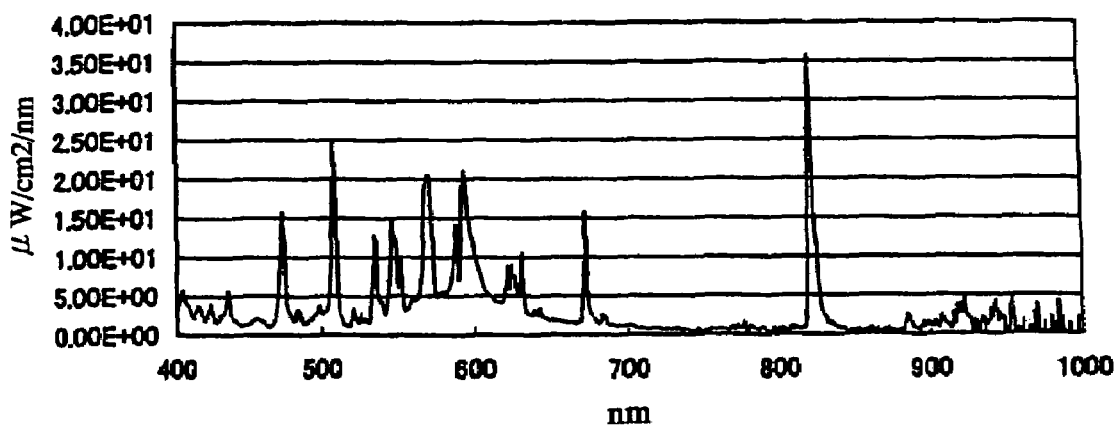
FIG. 6 is a graph showing spectral characteristics of a light with which the photochromic compound according to the present invention is irradiated.

As shown in FIG. 6, this xenon lamp has a peak of emission spectrum (bright line spectrum of xenon) at approximately 830 nm, which is within a region of not less than 700 nm and within infrared region.

Figure 7:
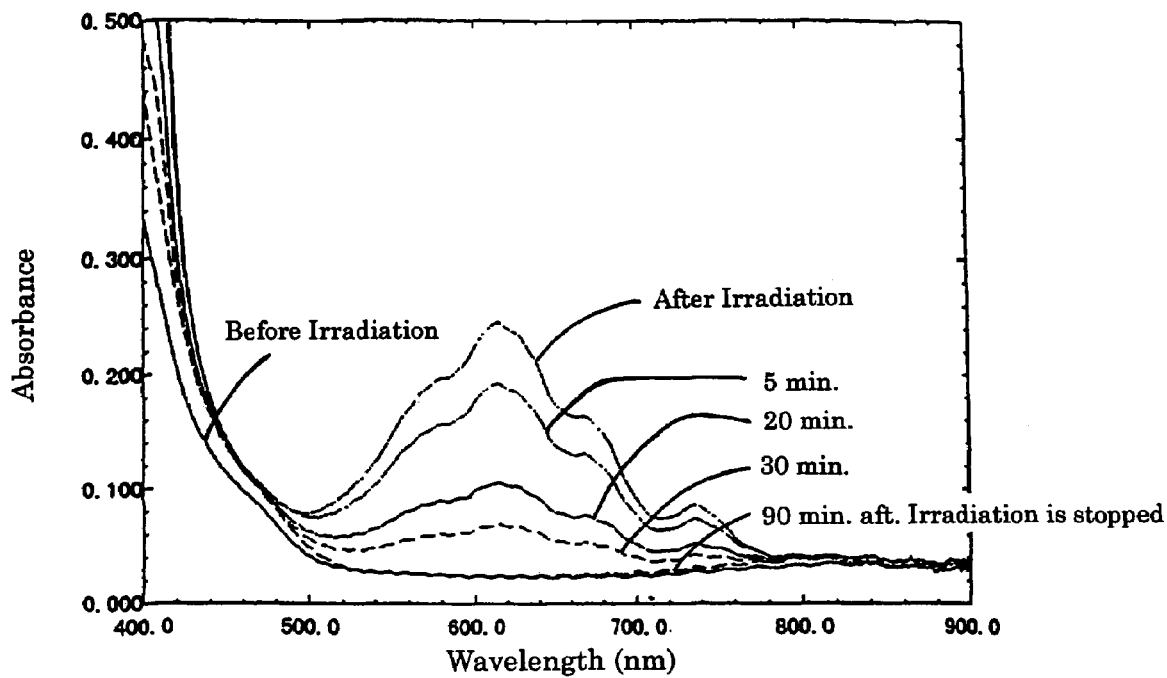
FIG. 7 is a graph showing a change in absorbance when a light having spectral characteristics shown in FIG. 6 with which the photochromic compound according to the present invention is irradiated.
Figure 8:
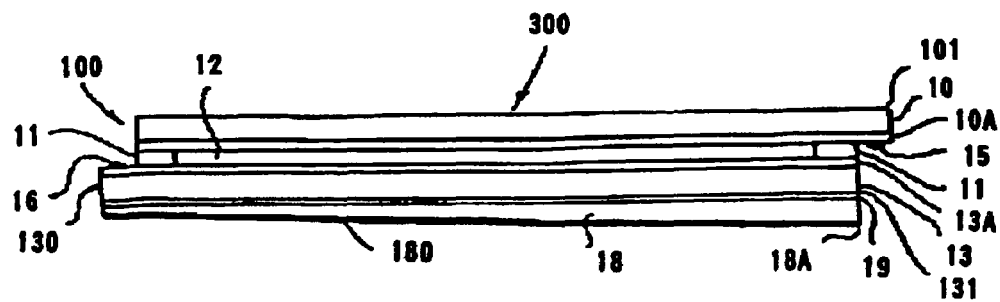
FIG. 8 is a plane view schematically showing a configuration of a reflectance-variable, automobile mirror, which is an automobile mirror utilizing the conventional electrochromic material.

As shown in FIG. 7, it can be understood that in the film containing the 4,4'-bipyridine derivative, the absorbance is instantly increased at a peak of approximately 610 nm upon the irradiation with a light of the xenon lamp. Also, it can be understood that as the time elapse after stopping the irradiation increases from 5 minutes, to 20 minutes, to 30 minutes, and to 90 minutes, the absorbency at the peak of approximately 610 nm is gradually decreased, and is returned to be its original state.

As described above, the 4,4'-bipyridine derivative is sensitized by a light containing an infrared light of 830 nm whereby increasing the absorbance at approximately 610 nm within a visible light region and turning the derivative blue. In addition, when the irradiation with a light containing the infrared light is stopped (or the derivative is placed in a dark), the derivative becomes colorless. Accordingly, the derivative has been found to exhibit the photochromic phenomenon, i.e., a colored state of a blue color and colorless bleached state reversibly take place.

While the present invention has been described by referring to the embodiments, the present invention is not restricted thereto, and various modification and alternation can be made without departing from the scope and the sprits of the present invention.

What is claimed is:

1. A photochromic device comprising:
    a photochromic layer comprising a photochromic material which exhibits absorbance in a visible region upon being sensitized by a light having a wavelength of not less than 700 nm; and
    an ultraviolet light blocking device configured to block an ultraviolet light from sensitizing the photochromic material in the photochromic layer,
    wherein the ultraviolet light blocking device comprises at least one of an ultraviolet shielding layer positioned to shield the photochromic layer from the ultraviolet light and an ultraviolet light absorber included in the photochromic layer, and the photochromic material comprises a compound selected from the group consisting of a 4,4'-bipyridine derivative represented by the formula (1), a 4,4'-bipyridine derivative represented by the formula (2), and a 4,4'-bipyridine derivative represented by the formula (3):

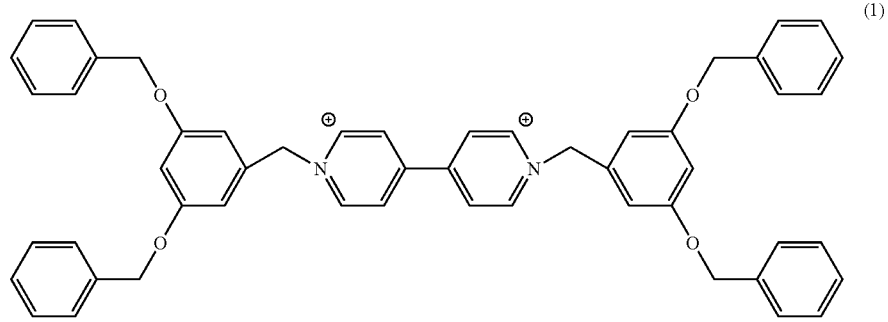

(1)

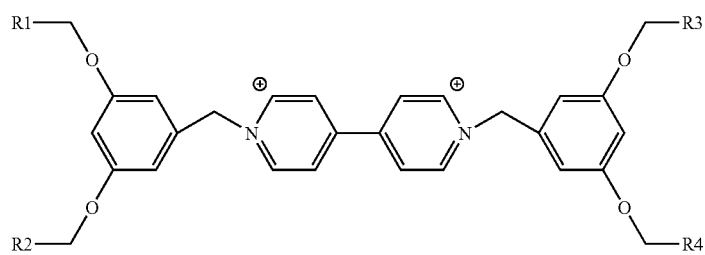

(2)

where $R_1$, $R_2$, $R_3$, and $R_4$ in the formula (2) are a condensed aromatic hydrocarbon or a derivative thereof and are the same or different from each other;

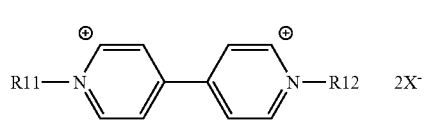

(3)

where $R_{11}$ and $R_{12}$ in the formula (3) are an alkyl group having 1 to 10 carbon atoms or a derivative thereof, and are the same or different from each other, and $X^-$ is selected from the group consisting of $Cl^-$, $BF_4^-$, $PF_6^-$, $AsF_6^-$, $ClO_4^-$, and $NO_3^-$.

2. The photochromic device according to claim 1, wherein the photochromic layer comprises a polymer matrix and the polymer matrix comprises one of a polymer selected from the group consisting of polyvinyl pyrolidone and polymethyl metacrylate and a polymer of a monomer selected from the group consisting of epoxy monomer, acrylic monomer and urethane monomer.

3. The photochromic device according to claim 1, wherein the photochromic layer comprises at least one solvent selected from the group consisting of dimethylformamide, dimethylacetamide, propylene carbonate, acetonitrile, gamma-butyllactone, and butanol.

4. The photochromic device according to claim 1, wherein the wavelength is in an infrared region and the absorbance has a peak at approximately 610 nm.

5. A photochromic device comprising:
a photochromic layer comprising a photochromic material which exhibits absorbance in a visible region upon being sensitized by a light having a wavelength of not less than 700 nm; and
an ultraviolet light blocking device configured to block an ultraviolet light from sensitizing the photochromic material in the photochromic layer,
wherein the ultraviolet light blocking device comprises at least one of an ultraviolet shielding layer positioned to shield the photochromic layer from the ultraviolet light and an ultraviolet light absorber included in the photochromic layer, and the photochromic layer comprises a polymer matrix and the polymer matrix comprises one of a polymer selected from the group consisting of polyvinyl pyrolidone and polymethyl metacrylate and a polymer of a monomer selected from the group consisting of epoxy monomer, acrylic monomer and urethane monomer.

6. The photochromic device according to claim 5, wherein the photochromic layer comprises at least one solvent selected from the group consisting of dimethylformamide, dimethylacetamide, propylene carbonate, acetonitrile, gamma-butyllactone, and butanol.

7. The photochromic device according to claim 5, wherein the wavelength is in an infrared region and the absorbance has a peak at approximately 610 nm.

8. A photochromic device comprising:
a photochromic layer comprising a photochromic material which exhibits absorbance in a visible region upon being sensitized by a light having a wavelength of not less than 700 nm; and
an ultraviolet light blocking device configured to block an ultraviolet light from sensitizing the photochromic material in the photochromic layer,
wherein the ultraviolet light blocking device comprises at least one of an ultraviolet shielding layer positioned to shield the photochromic layer from the ultraviolet light and an ultraviolet light absorber included in the photochromic layer, and the wavelength is in an infrared region and the absorbance has a peak at approximately 610 nm.

9. The photochromic device according to claim 8, wherein the photochromic layer comprises a polymer matrix and the polymer matrix comprises one of a polymer selected from the group consisting of polyvinyl pyrolidone and polymethyl metacrylate and a polymer of a monomer selected from the group consisting of epoxy monomer, acrylic monomer and urethane monomer.

10. The photochromic device according to claim 8, wherein the photochromic layer comprises at least one solvent selected from the group consisting of dimethylformamide, dimethylacetamide, propylene carbonate, acetonitrile, gamma-butyllactone, and butanol.

* * * * *